(12) United States Patent
O'Hare

(10) Patent No.: US 9,198,400 B2
(45) Date of Patent: Dec. 1, 2015

(54) ANIMAL MONITORING SYSTEM AND METHOD

(75) Inventor: Brendan O'Hare, Newry (GB)

(73) Assignee: FAIRE (NI) LIMITED, Newry (GB)

( * ) Notice: Subject to any disclaimer, the term of this patent is extended or adjusted under 35 U.S.C. 154(b) by 128 days.

(21) Appl. No.: 12/532,415

(22) PCT Filed: Mar. 18, 2008

(86) PCT No.: PCT/EP2008/002158
§ 371 (c)(1),
(2), (4) Date: Sep. 22, 2009

(87) PCT Pub. No.: WO2008/113556
PCT Pub. Date: Sep. 25, 2008

(65) Prior Publication Data
US 2010/0107985 A1 May 6, 2010

(30) Foreign Application Priority Data

Mar. 22, 2007 (GB) .................................. 0705452.1

(51) Int. Cl.
*A01K 29/00* (2006.01)
*A01K 15/00* (2006.01)
(52) U.S. Cl.
CPC .................................... *A01K 29/005* (2013.01)
(58) Field of Classification Search
USPC ......... 119/720, 14.08, 51.02, 712, 721, 14.18
IPC ....................... A01K 29/00,15/04, 15/02, 15/00
See application file for complete search history.

(56) References Cited

U.S. PATENT DOCUMENTS

| | | | | |
|---|---|---|---|---|
| 4,618,861 A | * | 10/1986 | Gettens et al. | 340/10.41 |
| 5,542,431 A | | 8/1996 | Starzl et al. | |
| 6,113,539 A | | 9/2000 | Ridenour | |
| 6,952,181 B2 | * | 10/2005 | Karr et al. | 342/457 |
| 7,328,671 B2 | * | 2/2008 | Kates | 119/720 |
| 2005/0081797 A1 | * | 4/2005 | Laitinen et al. | 119/720 |
| 2006/0011144 A1 | * | 1/2006 | Kates | 119/719 |
| 2006/0011146 A1 | * | 1/2006 | Kates | 119/719 |
| 2006/0027185 A1 | * | 2/2006 | Troxler | 119/721 |
| 2006/0103533 A1 | * | 5/2006 | Pahlavan et al. | 340/572.1 |
| 2007/0095304 A1 | * | 5/2007 | Rosenberg et al. | 119/720 |
| 2007/0204803 A1 | * | 9/2007 | Ramsay | 119/720 |

(Continued)

FOREIGN PATENT DOCUMENTS

| | | |
|---|---|---|
| EP | 0808567 A1 | 11/1997 |
| EP | 1169917 A1 | 9/2002 |

(Continued)

OTHER PUBLICATIONS

International Search Report and Written Opinion of the International Searching Authority from corresponding International (PCT) Application No. PCT/EP2008/002158, mailed Jul. 28, 2008.

*Primary Examiner* — Shadi Baniani
(74) *Attorney, Agent, or Firm* — Gardner, Linn, Burkhart & Flory, LLP

(57) ABSTRACT

An animal monitoring system, comprising a real time location system (RTLS) for individually identifying and tracking the movements of tagged animals in three dimensions within a monitoring zone, and a component for discriminating between different activities of at least one animal based upon the location of the animal's tag within the zone.

12 Claims, 4 Drawing Sheets

(56) References Cited

U.S. PATENT DOCUMENTS

| | | | |
|---|---|---|---|
| 2007/0266959 A1* | 11/2007 | Brooks | 119/720 |
| 2009/0044761 A1* | 2/2009 | Chapin et al. | 119/720 |
| 2009/0106044 A1* | 4/2009 | Schweisguth et al. | 705/2 |
| 2010/0030036 A1 | 2/2010 | Mottram et al. | |
| 2010/0045463 A1 | 2/2010 | Bradley et al. | |
| 2011/0298619 A1 | 12/2011 | O'Hare et al. | |

FOREIGN PATENT DOCUMENTS

| | | |
|---|---|---|
| GB | 2221161 A | 1/1990 |
| GB | 2437250 A | 10/2007 |
| GB | 2447101 A | 9/2008 |
| WO | WO 95/17853 A1 | 7/1995 |
| WO | 2004/093023 A3 | 10/2004 |
| WO | WO 2006/096932 A1 | 9/2006 |
| WO | WO 2007/091246 A2 | 8/2007 |
| WO | WO 2007/103886 A2 | 9/2007 |
| WO | WO 2007/132245 A1 | 11/2007 |
| WO | WO 2008/097111 A1 | 8/2008 |
| WO | WO 2008/113556 A1 | 9/2008 |
| WO | WO 2008/124481 A1 | 10/2008 |
| WO | WO 2008/139448 A1 | 11/2008 |
| WO | WO 2010/066429 A1 | 6/2010 |

* cited by examiner

ANIMAL MONITORING SYSTEM AND METHOD

RELATED APPLICATION

This application is a national phase patent application under 35 USC §371 of WO 2008/113556 filed on Mar. 18, 2008, which claims priority benefit of GB 0705452.1, filed on Mar. 22, 2007.

FIELD OF THE INVENTION

This invention relates to a system and method for monitoring animals, such as dairy cattle. As livestock systems (e.g. dairy, beef, sheep and pigs) become more intensive, there is a producer need to manage livestock on a larger scale where labour availability, skill and resources are often limited. This means that attention to individual animal health, fertility and effective heat detection are under constant time pressure, resulting in reduced herd performance and productivity and its consequential relative industry losses. Also, an increased need for bio-surveillance in the light of disease outbreaks, e.g. Foot and Mouth Disease (FMD), Bovine Spongiform Encephalopathy (BSE), etc., means increasing attention on individual animal status. In addition, consumer pressure in terms of food safety and animal welfare means that increasing attention is drawn to tracking animals and monitoring individual animal status, health, feeding and drinking.

It is an object of the invention to provide a system and method which can relieve the producer/vet/owner of at least some of the labour resources hitherto necessary to carry out these activities.

SUMMARY OF THE INVENTION

According to the present invention there is provided an animal monitoring system, comprising a real time location system (RTLS) for individually identifying and tracking the movements of tagged animals in three dimensions within a monitoring zone, and means for discriminating between different activities of at least one animal based upon the location of the animal's tag within the zone. A monitoring zone is defined as an area, either indoors or outdoors, within which the RTLS has effective coverage.

Preferably the discriminating means discriminates between different activities of at least one animal by comparing the location of the animal's tag within the zone with a datum in a computer model of the zone. Preferably, too, the system further discriminates between different activities of at least one animal by comparing the location of the animal's tag within the zone with the location of a second animal's tag within the zone.

In one embodiment, the system further includes at least one video camera for welfare surveillance of animals passing individually through a further zone, the system further individually identifying each animal in the further zone. In the preferred embodiment the monitoring zone comprises a dairy shed. Preferably the RTLS uses ultra-wideband technology.

The invention further provides a method of monitoring animals comprising individually identifying and tracking the movements of tagged animals in three dimensions within a monitoring zone, and discriminating between different activities of at least one animal based upon the location of the animal's tag within the zone.

BRIEF DESCRIPTION OF THE DRAWINGS

An embodiment of the invention will now be described, by way of example, with reference to the accompanying drawings, in which.

DETAILED DESCRIPTION OF CERTAIN EMBODIMENTS

Figure 1:
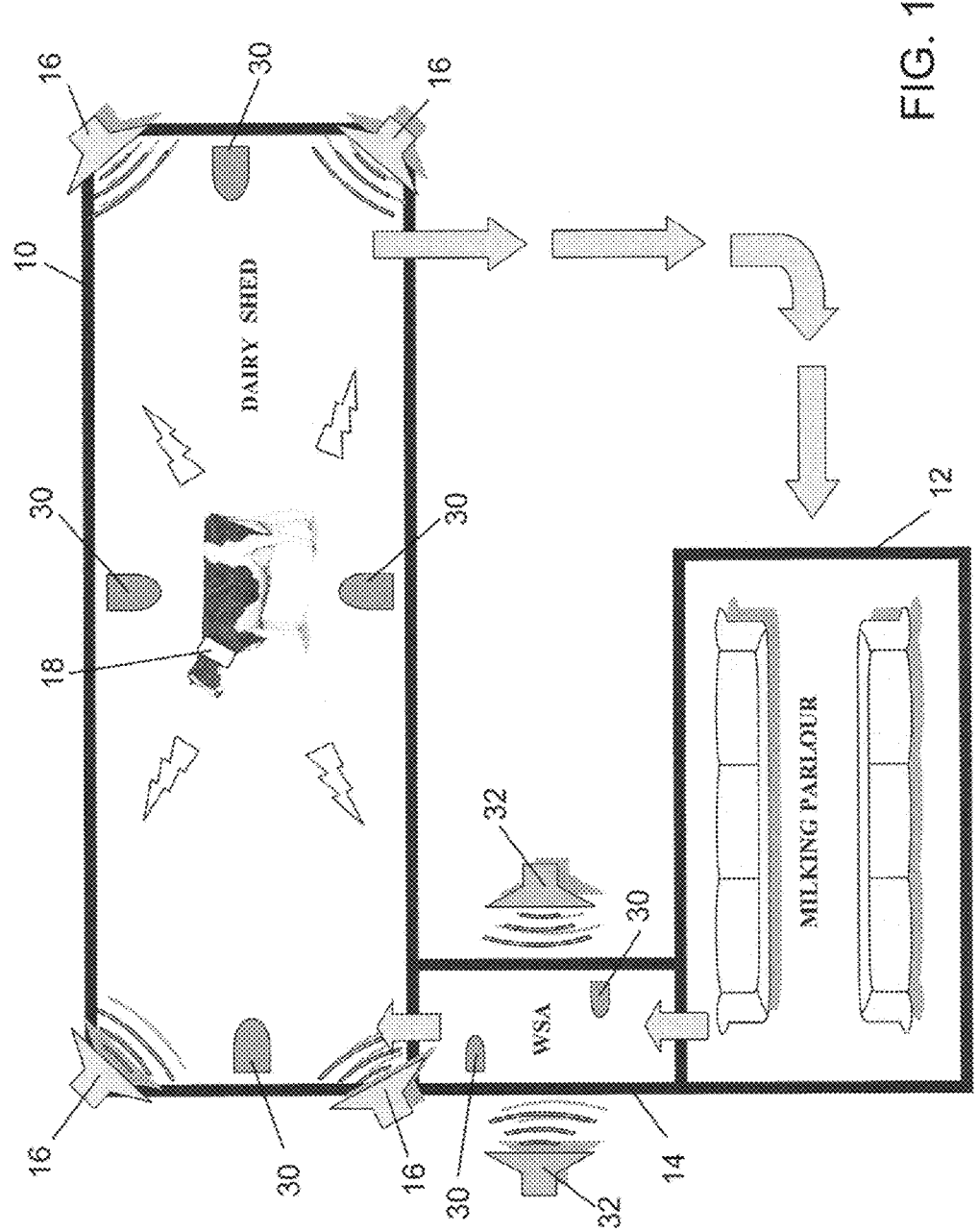
FIG. 1 is a schematic diagram of a dairy shed and milking parlour incorporating an RTLS system according to an embodiment of the invention.

Referring first to FIG. 1, a dairy shed 10 and milking parlour 12 are connected by a welfare surveillance area (WSA) 14. Although not shown in FIG. 1, the dairy shed 10 contains conventional stalls/cubical for the animals to rest, feeding/water troughs, and "loafing spaces" where the cattle socialise. As shown by the arrows, at milking times the cattle are led from the dairy shed 10 to the milking parlour 12. After milking the animals are led one by one through the WSA 14 back to the dairy shed 10.

The dairy shed 10 has a real time location system (RTLS) which is a known type of system used to track the location of objects in real time using tags (active or passive) attached to the objects and readers that receive wireless signals from these tags to determine their locations. In the present case the RTLS comprises four ultrawideband (UWB) readers 16 mounted at the corners of the shed 10, and individual UBW tags 18 incorporated in a neck collar (not shown) on each cow. The particular number and placement of the readers 16 will depend on the size and shape of the dairy shed or other zone being monitored.

In use of the system the location of each tag 18 in three-dimensions within the dairy shed 10 is tracked using multi-lateration techniques known in the art, for example using Time Difference of Arrival (TDOA) and Received Signal Strength Indicator (RSSI) techniques. To this end the raw data from the readers 16 is supplied to an associated data processing system 100 (FIG. 3) to determine, on an ongoing basis, the instantaneous 3D position of each tag 18 in the shed 10. UWB technology is used since it provides a long range and high accuracy, allowing the position of each tag to be determined to a high degree of accuracy. The signal emitted by each tag 18 and detected by the readers 16 not only allows the instantaneous location of the tag to be determined but also returns an ID unique to the animal bearing the tag.

The RTLS allows the processing system 100 to discriminate between different activities of the cattle by comparing the location of an animal's tag 18 within the dairy shed 10 with one or more datum lines in a computer model of the shed (virtual shed), and/or with the location of a second animal's tag within the shed. In particular, the system allows one to discriminate between the following activities: (a) an animal lying down, (b) an animal standing, (c) an animal mounting another animal, (d) an animal feeding, and (e) an animal at a water trough.

Figure 2A:
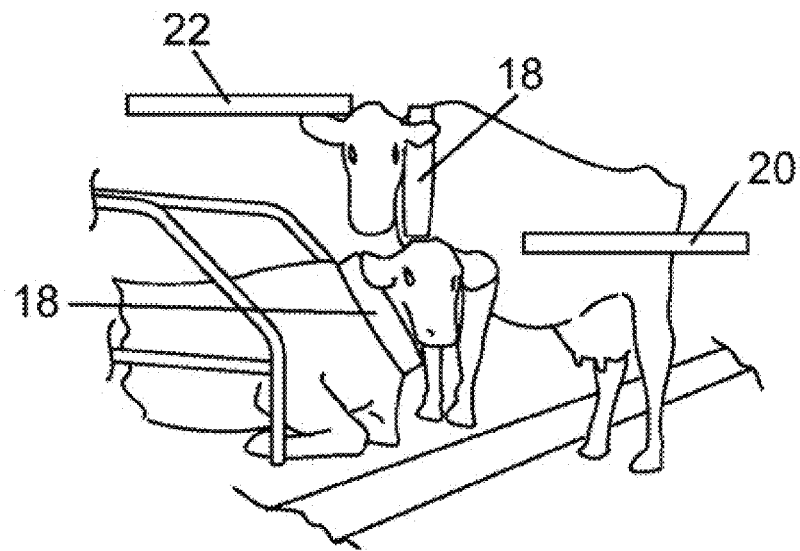
FIGS. 2A-2D show the detection of different activities of the cattle in the dairy shed using a computer model of the shed.

For example, FIG. 2A shows two horizontal datum lines 20, 22 superimposed on an actual view of the dairy shed. Here, the actual view stands in for the computer model. If the tag 18 of a cow in front of the stall (the right-hand cow in FIG. 2A) is below the datum line 20 it is assumed to be lying down, whereas if its tag is above the datum line 20 the cow is assumed to be standing. Likewise, if the tag 18 of a cow in the stall (the left-hand cow in FIG. 2A) is below the datum line 22 it is assumed to be lying down in the stall, whereas if its tag is above the datum line 22 the cow is assumed to be standing in the stall.

Figure 2B:
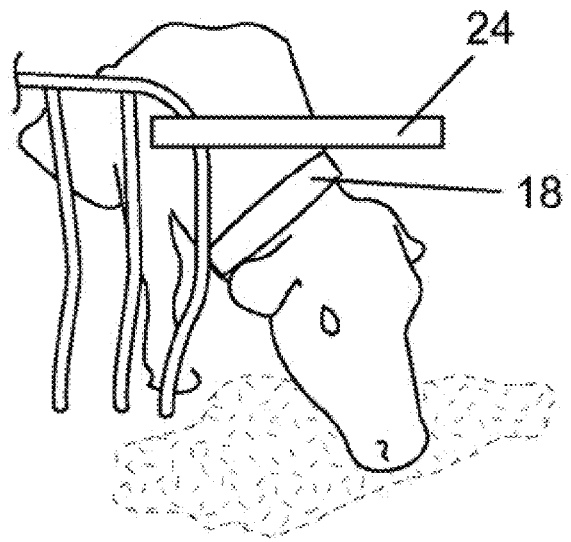

In FIG. 2B, a dairy cow is assumed to be feeding if its tag 18 is located below horizontal datum line 24 in a feeding area.

Figure 2C:
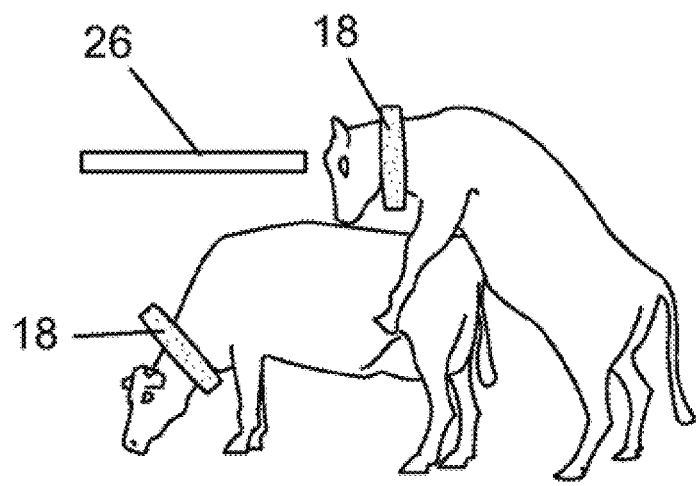

In FIG. 2C, one cow is assumed to be mounting another if its tag 18 moves above a horizontal datum line 26 (the animals are shown in a field in FIG. 2C, but the same principle applies inside the dairy shed 10).

Figure 2D:
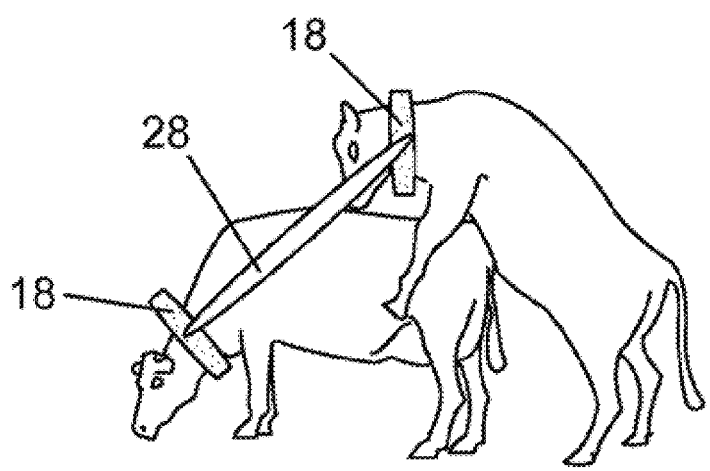

In addition to discriminating activities by comparing individual tag locations with datum lines, it is possible to determine an animal's likely activity by comparing the relative locations of two tags. For example, FIG. 2D, if two tags 18 lie within a region 28 having a particular angle to the horizontal and a particular length and the time duration is consistent, it is assumed that one is mounting the other.

The various activities detected by the animal monitoring system are logged and may be presented to the manager of the dairy form upon demand. By logging events of interest over, say, a 12 or 24 hr period, it is possible to determine the activity of a particular subset of animals within the overall group, the activity of all animals over the given period, e.g. 12/24 hrs, displaying mating behaviour, animals not feeding or watering, animals not found in the "loafing spaces", animals not resting, and the speed of movement of a particular animal or group of animals. In addition to animal tracking in the main dairy shed 10, digital video surveillance cameras 30 monitor animals as they pass individually through the WSA 14. This allows suspect animals, e.g. those suspected to be diseased or infertile or suffering from some other malady such as lameness, to be remotely viewed and any tentative diagnosis confirmed. The identity of each animal passing through the WSA 14 is determined by further readers 32. Here, the 3D location of the tag is not important, but the identity of the animal passing through the WSA 14, so that the video image can be correctly associated with the suspect animal.

If the WSA 14 is close enough to the dairy shed 10 to be incorporated in the same RTLS covering the dairy shed, the readers 32 can be USB readers, the same as the readers 16. However, if they cannot be reasonably incorporated in the same RTLS, then the readers can be RFID readers. These have a shorter range than UWB readers and are less accurate for spatial location. However, they are sufficient to identify animals passing one by one through the WSA 14. If RFID readers are used, then the animal's tags 18 will be dual UWB/RFID tags.

If desired, video cameras 30 can also be placed to survey the main dairy shed 10, which can also be considered a WSA.

Figure 3:
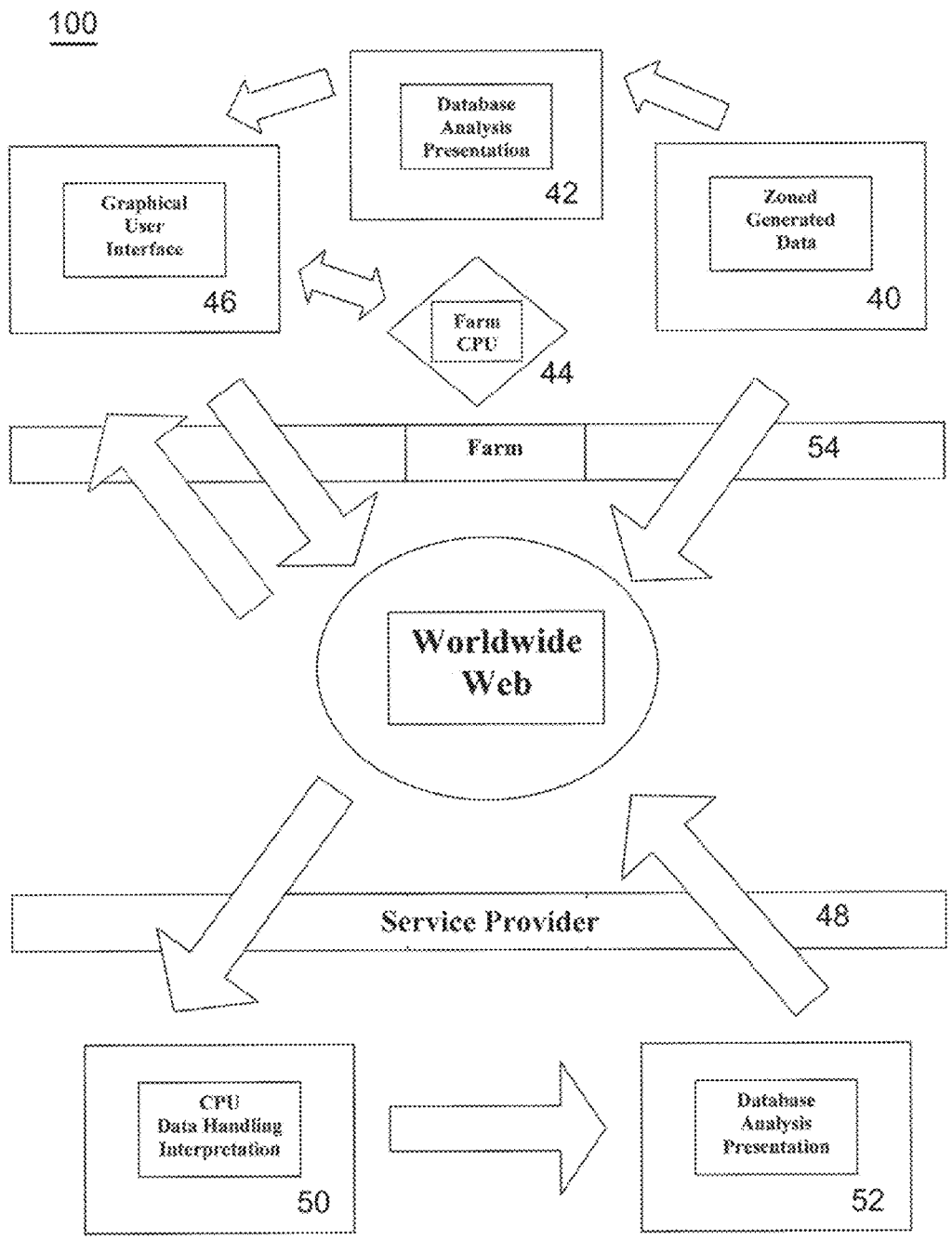
FIG. 3 is a block diagram of the signal processing system associated with the RTLS system.

FIG. 3 is a block diagram of the signal processing system 100 associated with the RTLS system. It will be understood that the various modules shown in FIG. 3 represent functions performed by the system and do not necessarily correspond to discrete hardware/software elements.

If the raw data 40 from the readers 16 is to be processed locally at the farm 54, it is passed to module 42 incorporating a database in which is stored the computer model of the dairy shed 10. The computer model is, for example, an AutoCAD model created to include all relevant dimensions and features of the dairy shed (e.g. stalls, feeding troughs, "loafing spaces") in three-dimensions, and incorporates a standard date/time reference clock. The heights of the datum lines are layered onto this model and are chosen to reflect the particular animals being monitored, in this case dairy cattle.

Module 42 analyses the raw data 40 by comparing the tracked movements with the datum lines, such as 20 to 26, to discriminate between the various activities of the animals referred to above. Typically the location of each animal is determined (interrogated) every 1 second to 5 minutes, depending on the particular region of the dairy shed being monitored (e.g. animals in stalls are likely to move less often than elsewhere), although the interrogation frequency can be varied on an individual animal basis if desired, for example, if a close watch is to be kept on a particular animal suspected to be sick.

For each interrogation the module 42 provides output data including date/time stamp, animal (i.e. tag) location in 3 dimensions, and animal ID. Successive sets of such output data are used to determine the animal's activity, by comparison of the location of the animal's tag with the datum lines and/or with the tags of other animals. It is also possible to determine the length of time that an animal has been in a particular location or region of the dairy shed. This enables, for example, an alarm to be raised if the duration is longer than a preset time for a normal event in that particular region, e.g. the passage walkway or stalls or loafing areas. An example would be an animal lying down in the passageway. This would be an unusual event; hence its detection by the system and the raising of an alarm which can be captured on video surveillance and forwarded to the farm manager.

The results are processed for presentation as charts, tables or other desired format. These results are accessed by the farm manager on the farm's CPU 44 via a graphical user interface 46.

In the case where the farm does not have the facility to process the raw data itself, it can be sent via the Internet to a service provider 48. Here the module 50 sorts the incoming data (i.e. recognises it as originating from a particular one of typically many farms serviced by the provider 48) and passes it to module 52 which functions substantially the same as module 42 already described. The results can be accessed by the farm manager over the internet via the graphical user interface 46. Although the foregoing has described the invention applied to livestock animals, in particular dairy cattle, it is also a valuable tool in the welfare and monitoring of non-livestock animals, e.g. equines, small animal breeders, avian, zoo/wildlife, goats and kennel environments.

The invention is not limited to the embodiments described herein which may be modified or varied without departing from the scope of the invention.

What is claimed is:

1. An animal behaviour determining system comprising:
   a real time location system (RTLS) in three dimensions within a monitoring zone for individually identifying and tracking the location of a plurality of tagged animals;
   a tag for securing to each animal;
   a computer;
   a computer database accessible to the computer and to the RTLS, the computer database including a three-dimensional computer model of the monitoring zone and a plurality of substantially horizontal datum lines at different predetermined heights in the computer model of the monitoring zone;
   a computer program accessible to the computer, the computer program being executable by the computer to discriminate between different behavioural activities of the tagged animals based upon the identified three-dimensional location of each animal's tag within the monitoring zone; and
   a graphical user interface;
   wherein the computer program is operable by the computer to discriminate between different behavioural activities of each tagged animal based upon both (i) the identified three-dimensional locations of respective tags of first and second tagged animals within the monitoring zone as determined by the RTLS compared with the predetermined heights of the plurality of substantially horizontal datum lines and (ii) the identified three-dimensional location of the tag of the first tagged animal as defined by the RTLS within the monitoring zone compared with the identified three-dimensional location of the tag of the second tagged animal as defined by the RTLS within the monitoring zone; and wherein the computer program is operable by the computer to discriminate between two or more different behavioural activities chosen from (i) the first tagged animal mounting the second tagged animal, in which the tag of the first tagged animal is above a first of the datum lines and the tag of the second tagged animal is below the first datum line, (ii) the first tagged animal feeding, in which the tag of the first tagged animal is below a second of the datum lines, and (iii) the first tagged animal lying down, in which the tag of the first tagged animal is below a third of the datum lines, and wherein the various behavioural activities detected by the discriminating means are logged by the computer for presentation to an operator upon demand; and wherein the graphical user interface is operable to display results of the animal behaviour determining system.

2. The animal behaviour determining system of claim 1, wherein the computer program is operable by the computer to discriminate between the different behavioural activities comprising the first tagged animal mounting the second tagged animal and the first tagged animal feeding.

3. The animal behaviour determining system of claim 1, further comprising a plurality of ultra-wide band readers configured to be mounted at fixed locations relative to the monitoring zone, a video camera for welfare surveillance of animals, wherein each of the tags is an ultra-wide band tag that is external to the animal and individually identifies each animal.

4. The animal behaviour determining system of claim 1, wherein the location of the tag of each animal in three-dimensions within the monitoring zone is established using multilateration techniques, comprising Time Difference of Arrival (TDOA) or Received Signal Strength Indicator (RSSI) techniques.

5. The animal behaviour determining system of claim 1, wherein the system further includes at least one video camera for welfare surveillance of animals passing individually through a further zone.

6. The animal behaviour determining system of claim 1, wherein the system further includes means for individually identifying each animal.

7. The animal behaviour determining system of claim 6, wherein each animal is identified by a unique identifier code associated with the tag of each animal.

8. The animal behaviour determining system of claim 1, further in combination with the monitoring zone, wherein the monitoring zone comprises a dairy shed.

9. The animal behaviour determining system of claim 1, wherein the animal tags comprise ultra-wide band tags and the RTLS comprises a plurality of ultra-wide band readers.

10. The animal behaviour determining system of claim 1, wherein the tag is incorporated into a neck collar and is operable to return an identification that is unique to the animal bearing the tag.

11. An animal behaviour determining system comprising:
a real time location system (RTLS) in three dimensions within a monitoring zone with a reader for individually identifying and tracking the location of a tagged animal;
a tag for securing to each animal; and
a module having a computer database with stored heights of a plurality of substantially horizontal datum lines in a three-dimensional computer model of the monitoring zone, wherein the module is operable to (i) analyze data from the reader by comparing a height of each tag with the respective heights of the substantially horizontal datum lines, (ii) provide successive sets of output data including location of each tag in three dimensions and the identity of each tag, (iii) discriminate between different behavioural activities of the animal based upon the identified three-dimensional location of each of the tags within the monitoring zone, and (iii) discriminate between different behavioural activities of the tagged animal by comparing the identified three-dimensional location of each tag as defined by the RTLS within the monitoring zone with at least one of the plurality of substantially horizontal datum lines in association with the database.

12. The animal behaviour determining system of claim 11, wherein the module is operable to discriminate the behavioural activity as a first tagged animal vertically mounting a second tagged animal when (i) the tag of the first tagged animal is above a first of the datum lines and a tag of a second tagged animal is below the first of the datum lines, and (ii) the tag of the first tagged animal is in close proximity to the tag of the second tagged animal.

* * * * *